(12) United States Patent
Hanrahan et al.

(10) Patent No.: US 12,158,112 B1
(45) Date of Patent: Dec. 3, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventors: Paul R. Hanrahan, Sedona, AZ (US); Gregory E. Reinhardt, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/205,333

(22) Filed: Jun. 2, 2023

(51) Int. Cl.
*F02C 7/36* (2006.01)
*F01D 15/12* (2006.01)

(52) U.S. Cl.
CPC .............. *F02C 7/36* (2013.01); *F01D 15/12* (2013.01); *F05D 2260/40311* (2013.01)

(58) Field of Classification Search
CPC ... F02C 7/36; F01D 15/12; F05D 2260/40311
See application file for complete search history.

(56) References Cited

U.S. PATENT DOCUMENTS

| | | |
|---|---|---|
| 6,524,068 B2 | 2/2003 | Carter, Jr. |
| 11,167,845 B2 | 11/2021 | Schank |
| 11,365,688 B2 | 6/2022 | Molesini |
| 2009/0000271 A1* | 1/2009 | Kupratis ............... F02C 7/36 60/39.15 |
| 2011/0206498 A1* | 8/2011 | McCooey ............... F02K 3/06 475/348 |
| 2011/0305572 A1* | 12/2011 | Bellis ................... B64D 35/06 416/129 |
| 2020/0070990 A1* | 3/2020 | Harvey ................. B64D 27/00 |
| 2022/0119119 A1* | 4/2022 | Dubreuil ............... F02C 6/00 |

* cited by examiner

*Primary Examiner* — Shafiq Mian
(74) *Attorney, Agent, or Firm* — Getz Balich LLC

(57) ABSTRACT

An assembly is provided for an aircraft. This aircraft assembly includes a geartrain, a first bladed rotor, a second bladed rotor and a rotating structure. The geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first bladed rotor is coupled to the ring gear. The second bladed rotor is coupled to the carrier. The rotating structure is coupled to the sun gear. The rotating structure includes a turbine rotor. The rotating structure is configured to drive rotation of the first bladed rotor and the second bladed rotor through the geartrain.

18 Claims, 12 Drawing Sheets

SELECTIVE POWER DISTRIBUTION FOR AN AIRCRAFT PROPULSION SYSTEM

BACKGROUND OF THE DISCLOSURE

1. Technical Field

This disclosure relates generally to an aircraft and, more particularly, to selective power distribution between various aircraft propulsion system rotors.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft. This aircraft assembly includes a geartrain, a first bladed rotor, a second bladed rotor and a rotating structure. The geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first bladed rotor is coupled to the ring gear. The second bladed rotor is coupled to the carrier. The rotating structure is coupled to the sun gear. The rotating structure includes a turbine rotor. The rotating structure is configured to drive rotation of the first bladed rotor and the second bladed rotor through the geartrain.

According to another aspect of the present disclosure, another assembly is provided for an aircraft. This aircraft assembly includes a powertrain, a first bladed rotor, a second bladed rotor and a rotating structure. The powertrain includes an epicyclic geartrain. The epicyclic geartrain includes a first output, a second output and an input. A first bladed rotor is coupled to the first output and is configured to rotate about an axis. The second bladed rotor is coupled to the second output and is configured to rotate about the axis. The rotating structure is coupled to the input. The rotating structure includes a turbine rotor. The powertrain is configured to transfer rotational power from the rotating structure to the first bladed rotor during a first mode where the second bladed rotor is stationary. The powertrain is configured to transfer rotational power form the rotating structure to the first bladed rotor and the second bladed rotor during a second mode.

According to still another aspect of the present disclosure, another assembly is provided for an aircraft. This aircraft assembly includes an epicyclic geartrain, a first bladed rotor, a second bladed rotor and a rotating structure. The epicyclic geartrain includes a first output, a second output and an input. The first bladed rotor is coupled to the first output and is configured to rotate about an axis. The first bladed rotor includes a plurality of first rotor blades arranged circumferentially about the axis. A first of the first rotor blades has a first span length. The second bladed rotor is coupled to the second output and is configured to rotate about the axis. The second bladed rotor includes a plurality of second rotor blades arranged circumferentially about the axis. A first of the second rotor blades has a second span length. The first span length is greater than two times the second span length. The rotating structure is coupled to the input. The rotating structure includes a turbine rotor. The rotating structure is configured to drive rotation of the first bladed rotor and the second bladed rotor through the geartrain.

The aircraft assembly may include a propulsor duct. A span of the first bladed rotor may extend radially across the propulsor duct. A span of the second bladed rotor may not extend radially across the propulsor duct.

The powertrain may also include: a lock device configured to lock rotation of the second bladed rotor about the axis; and/or a brake configured to brake rotation of the second bladed rotor about the axis.

The first bladed rotor may be configured as or otherwise include a propulsor rotor. The second bladed rotor may be configured as or otherwise include a compressor rotor.

The aircraft assembly may also include a duct. The first bladed rotor and the second bladed rotor may each be arranged in the duct.

The first bladed rotor may include a plurality of first rotor blades arranged circumferentially about the axis. A first of the first rotor blades may have a first span length. The second bladed rotor may include a plurality of second rotor blades arranged circumferentially about the axis. A first of the second rotor blades may have a second span length. The first span length may be greater than the second span length.

The first span length may be greater than one and one-quarter times the second span length.

The first span length may be greater than two times the second span length.

The first bladed rotor may be disposed upstream of the second bladed rotor within the duct.

The first bladed rotor may be disposed downstream of the second bladed rotor within the duct.

The aircraft assembly may also include a shroud radially adjacent and circumscribing the second bladed rotor. The first bladed rotor may include a plurality of first rotor blades arranged circumferentially about the axis. A leading edge of the shroud may be radially aligned with an intermediate position along a span of a first of the first rotor blades.

The aircraft assembly may also include an inner flowpath and an outer flowpath radially outboard of the inner flowpath. The first bladed rotor may be configured to direct air into the inner flowpath and the outer flowpath. The second bladed rotor and the turbine rotor may be disposed in the inner flowpath.

The aircraft assembly may also include a bleed valve configured to fluidly couple the inner flowpath and the outer flowpath. The bleed valve may be disposed downstream of the second bladed rotor along the inner flowpath.

The rotating structure may also include a compressor rotor disposed in the inner flowpath. The bleed valve may be disposed along the inner flowpath between the second bladed rotor and the compressor rotor.

The aircraft assembly may also include a lock device configured to lock rotation of the carrier about the axis.

The lock device may be configured as or otherwise include a splined coupling.

The aircraft assembly may also include a brake configured to brake rotation of the carrier about the axis.

The brake may be configured as or otherwise include a disk brake.

The aircraft assembly may also include a third bladed rotor coupled to the sun gear. The rotating structure may also be configured to drive rotation of the third bladed rotor. The geartrain may be between the rotating structure and the third bladed rotor.

The axis may be a first rotor axis. The first bladed rotor and the second bladed rotor may be rotatable about the first rotor axis. The third bladed rotor may be rotatable about a second rotor axis that is angularly offset from the first rotor axis.

The first bladed rotor may be configured to generate propulsive force in a first direction. The second bladed rotor may be configured to generate propulsive force in a second direction that is different than the first direction.

The first bladed rotor may be configured as or otherwise include a ducted rotor. In addition or alternatively, the second bladed rotor may be configured as or otherwise include an open rotor.

The aircraft assembly may also include a gas turbine engine core including a compressor section, a combustor section, a turbine section and the rotating structure. The turbine rotor may be within the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
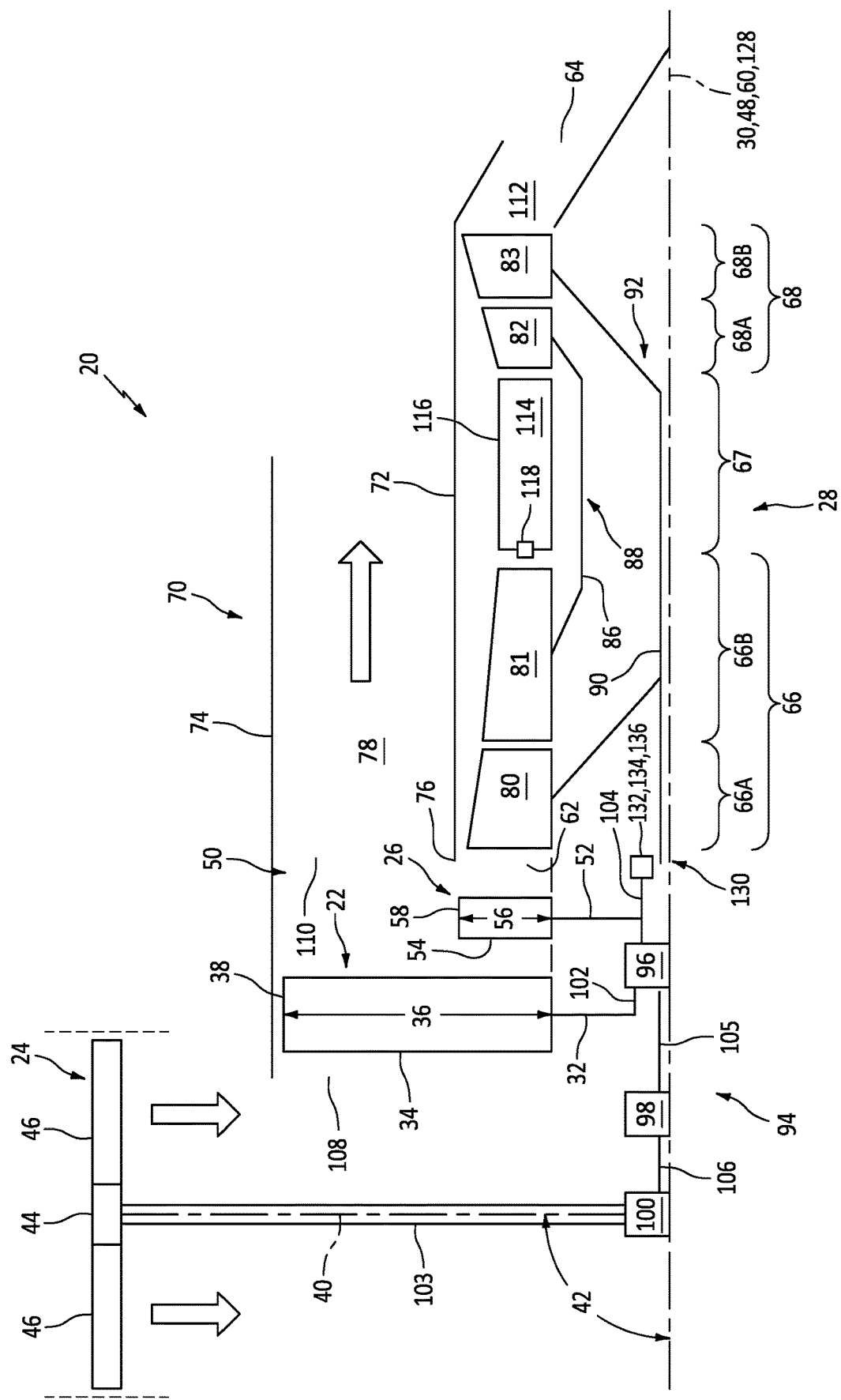
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)) or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a bladed first compressor rotor 26 (e.g., a stub compressor rotor) and a gas turbine engine core 28 configured to rotatably drive one or more of the bladed rotors 22, 24 and/or 26.

The first propulsor rotor 22 may be configured as a ducted rotor such as a fan rotor, or it may be non-ducted, such as an open rotor configuration. The first propulsor rotor 22 of FIG. 1 is rotatable about a first rotor axis 30. This first rotor axis 30 is an axial centerline of the first propulsor rotor 22 and may be horizontal when the aircraft is on ground and/or during level aircraft flight. The first propulsor rotor 22 includes at least a first propulsor rotor disk 32 ("first propulsor disk") and a plurality of first propulsor rotor blades 34 ("first propulsor blades") (one visible in FIG. 1); e.g., fan blades. The first propulsor blades 34 are distributed circumferentially around the first propulsor disk 32 in an annular array. Each of the first propulsor blades 34 is connected to and projects spanwise (e.g., radially relative to the first rotor axis 30) out from the first propulsor disk 32. More particularly, each first propulsor blade 34 has a first propulsor blade span 36. This first propulsor blade span 36 extends spanwise along a span line of the respective first propulsor blade 34 from a platform for the respective first propulsor blade 34 to a tip 38 of the respective first propulsor blade 34.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 40. This second rotor axis 40 is an axial centerline of the second propulsor rotor 24 and may be vertical when the aircraft is on the ground and/or during level aircraft flight. The second rotor axis 40 is angularly offset from the first rotor axis 30 by an included angle 42; e.g., an acute angle or a right angle. This included angle 42 may be between sixty degrees (60°) and ninety degrees (90°); however, the present disclosure is not limited to such an exemplary relationship. The second propulsor rotor 24 includes at least a second propulsor rotor disk 44 ("second propulsor disk") and a plurality of second propulsor rotor blades 46 ("second propulsor blades"); e.g., open rotor blades. The second propulsor blades 46 are distributed circumferentially around the second propulsor disk 44 in an annular array. Each of the second propulsor blades 46 is connected to and projects spanwise (e.g., radially relative to the second rotor axis 40) out from the second propulsor disk 44.

The first compressor rotor 26 of FIG. 1 is rotatable about a first compressor axis 48. The first compressor axis 48 is an axial centerline of the first compressor rotor 26 and may be horizontal when the aircraft is on the ground and/or during level aircraft flight. This first compressor axis 48 may be parallel (e.g., coaxial) with the first rotor axis 30 and, thus, angularly offset from the second rotor axis 40. The first compressor rotor 26 of FIG. 1 is arranged downstream (e.g., axially aft) of the first propulsor rotor 22 within a duct 50. However, referring to FIG. 2, the first compressor rotor 26 may alternatively be disposed upstream (e.g., axially forward) of the first propulsor rotor 22 within the duct 50. Referring again to FIG. 1, the first compressor rotor 26 includes at least a first compressor rotor disk 52 ("first compressor disk") and a plurality of first compressor rotor blades 54 ("first compressor blades") (one visible in FIG. 1); e.g., stub compressor blades. The first compressor blades 54 are distributed circumferentially around the first compressor disk 52 in an annular array. Each of the first compressor blades 54 is connected to and projects spanwise (e.g., radially relative to the first compressor axis 48) out from the first compressor disk 52. More particularly, each first compressor blade 54 has a first compressor blade span 56. This first compressor blade span 56 extends spanwise along a span line of the respective first compressor blade 54 from a platform for the respective first compressor blade 54 to a tip 58 of the respective first compressor blade 54.

Figure 2:
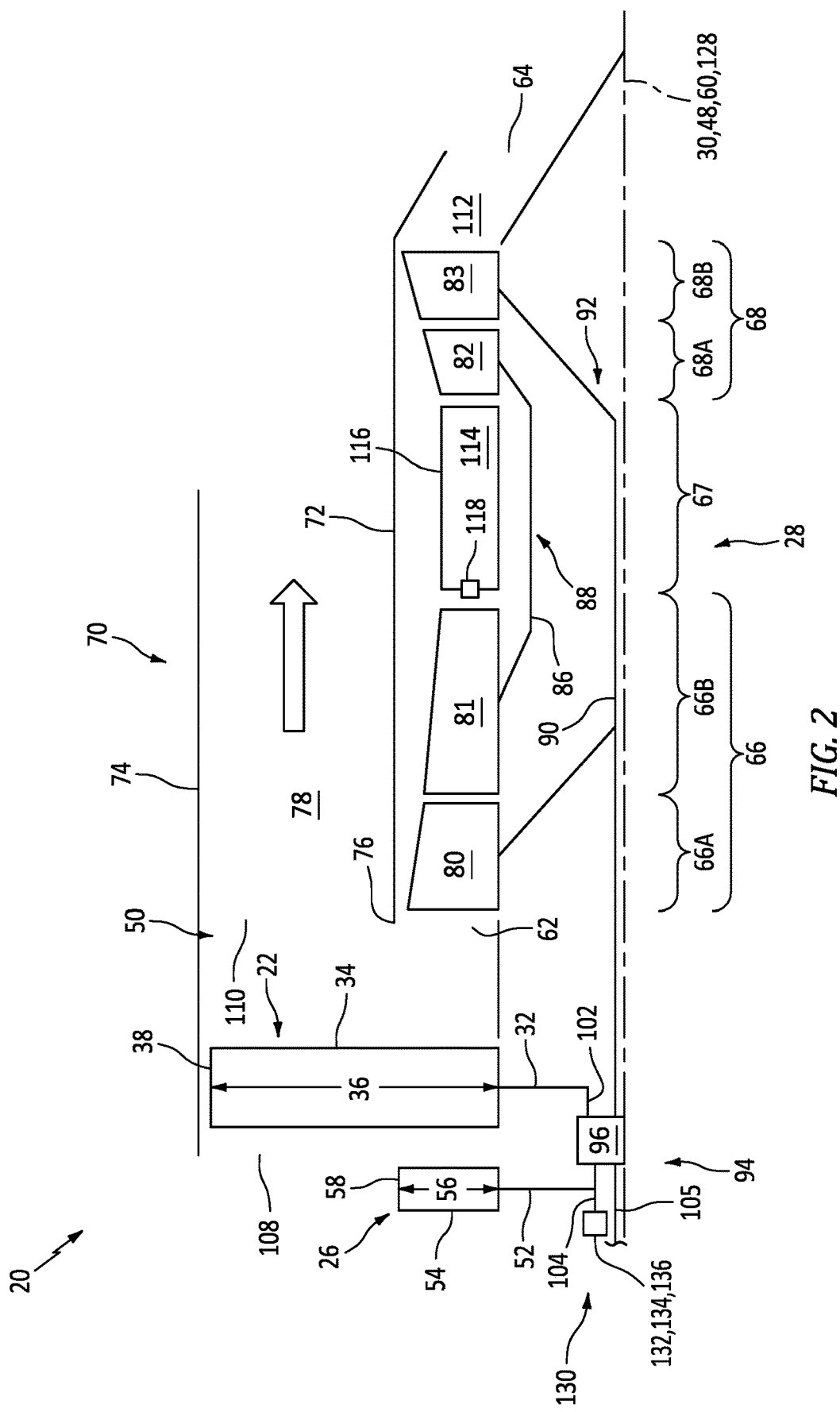
FIG. 2 is a schematic illustration of a portion of the aircraft propulsion system with an upstream stub compressor rotor.

The first compressor blade span 56 is sized smaller than the first propulsor blade span 36. The first propulsor blade span 36 of FIG. 1, for example, is sized equal to or greater than two times (2×), two and one-half times (2.5×) or three times (3×) the first compressor blade span 56; e.g., up to ten times (10×) the first compressor blade span 56. The present disclosure, however, is not limited to such an exemplary dimensional relationship. For example, the first propulsor blade span 36 of FIG. 2 is sized equal to or greater than one and one-quarter times (1.25×), one and one half times (1.5×) or two times (2×) the first compressor blade span 56; e.g., up to ten times (10×) the first compressor blade span 56.

The engine core 28 extends axially along a core axis 60 from a forward, upstream inlet 62 into the engine core 28 to an aft, downstream exhaust 64 from the engine core 28. The core axis 60 may be an axial centerline of the engine core 28 and may be horizontal when the aircraft is on the ground and/or during level aircraft flight. This core axis 60 may be parallel (e.g., coaxial) with the axes 30 and 48 and, thus, angularly offset from the second rotor axis 40. The engine core 28 of FIG. 1 includes a core compressor section 66, a core combustor section 67 and a core turbine section 68. The core compressor section 66 of FIG. 1 includes a low pressure compressor (LPC) section 66A and a high pressure compressor (HPC) section 66B. The core turbine section 68 of FIG. 1 includes a high pressure turbine (HPT) section 68A and a low pressure turbine (LPT) section 68B.

The first propulsor rotor 22, the first compressor rotor 26 and the engine sections 66A-68B may be arranged sequentially along the core axis 60 and within an engine housing 70. This engine housing 70 includes an inner case 72 (e.g., a core case) and an outer case 74 (e.g., a fan case).

The inner case 72 may house one or more of the engine sections 66A-68B; e.g., the engine core 28. In the arrangement of FIG. 1, an upstream end 76 of the inner case 72 of FIG. 1 is disposed downstream (e.g., axially aft) of both the first propulsor rotor 22 and the first compressor rotor 26. Moreover, the upstream end of the inner case 72 may be axially separated from the first compressor rotor 26 by a relatively large axial gap. In other embodiments, however, it is contemplated the first compressor rotor 26 may be disposed axially adjacent the upstream end 76 of the inner case 72. In still other embodiments, it is contemplated the first compressor rotor 26 may be housed by the inner case 72 (or a shroud) and, thus, downstream of the upstream end 76 of the inner case 72.

The outer case 74 may form the duct 50 and house the first propulsor rotor 22 and the first compressor rotor 26. The outer case 74 of FIG. 1 also axially overlaps and extends circumferentially about (e.g., completely around) the inner case 72 thereby at least partially forming an outer bypass flowpath 78 (e.g., an annular bypass flowpath) radially between the inner case 72 and the outer case 74. In the arrangement of FIG. 1, a wall of the outer case 74 is disposed radially outboard of and adjacent (e.g., in close proximity to) each first propulsor blade tip 38. By contrast, the wall of the outer case 74 of FIG. 1 is radially separated from each first compressor blade tip 58 by a relatively large radial gap, which radial gap may substantially account for the span size difference between the first propulsor blades 34 and the first compressor blades 54.

Each of the engine sections 66A-68B includes a bladed rotor 80-83 within that respective engine section 66A-68B. Each of these bladed rotors 80-83 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The HPC rotor 81 is connected to the HPT rotor 82 through a high speed shaft 86. At least (or only) the HPC rotor 81, the HPT rotor 82 and the high speed shaft 86 collectively form a high speed rotating structure 88. This high speed rotating structure 88 is rotatable about the core axis 60. The LPC rotor 80 is connected to the LPT rotor 83 through a low speed shaft 90. At least (or only) the LPC rotor 80, the LPT rotor 83 and the low speed shaft 90 collectively form a low speed rotating structure 92. This low speed rotating structure 92 is rotatable about the core axis 60. The low speed rotating structure 92 and, more particularly, its low speed shaft 90 may project axially through a bore of the high speed rotating structure 88 and its high speed shaft 86.

The aircraft propulsion system 20 of FIG. 1 includes a powertrain 94 that couples the low speed rotating structure 92 to the first propulsor rotor 22, the second propulsor rotor 24 and the first compressor rotor 26. The powertrain 94 of FIG. 1 includes a geartrain 96, a transmission 98 and a gearing 100; e.g., bevel gearing. The powertrain 94 of FIG. 1 also includes one or more shafts 102-106 and/or other torque transmission devices for coupling the geartrain 96 to the first propulsor rotor 22, the second propulsor rotor 24 and the first compressor rotor 26.

An input to the geartrain 96 is coupled to the low speed rotating structure 92 and its low speed shaft 90, where the low speed rotating structure 92 forms a power input for the geartrain 96. A first output from the geartrain 96 is coupled to the first propulsor rotor 22 through the first propulsor shaft 102, where the first propulsor rotor 22 forms a first power output (e.g., load) for the geartrain 96. A second output from the geartrain 96 is coupled to the second propulsor rotor 24 through the powertrain elements 105, 98, 106, 100 and 103, where the second propulsor rotor 24 forms a second power output (e.g., load) for the geartrain 96. A third output from the geartrain 96 is coupled to the first compressor rotor 26 through the first compressor shaft 104, where the first compressor rotor 26 forms a third power output (e.g., load) for the geartrain 96.

An output of the transmission 98 is connected to the gearing 100 through the transmission output shaft 106. This transmission 98 may be configured to selectively couple (e.g., transfer mechanical power between) the geartrain output shaft 105 and the transmission output shaft 106. During the first mode of operation, for example, the transmission 98 may be configured to decouple the geartrain output shaft 105 from the transmission output shaft 106, thereby decoupling the low speed rotating structure 92 from the second propulsor rotor 24. During the second mode of operation, the transmission 98 may be configured to couple the geartrain output shaft 105 with the transmission output shaft 106, thereby coupling the low speed rotating structure 92 with the second propulsor rotor 24. This transmission 98 may be configured as a clutched or clutchless transmission.

An output of the gearing 100 is connected to the second propulsor rotor 24 through the second propulsor shaft 103. This gearing 100 provides a coupling between the transmission output shaft 106 rotating about the axis 30, 48, 60 and the second propulsor shaft 103 rotating about the second rotor axis 40. The gearing 100 may also provide a speed change mechanism between the transmission output shaft 106 and the second propulsor shaft 103. The gearing 100, however, may alternatively provide a 1:1 rotational coupling between the transmission output shaft 106 and the second propulsor shaft 103 such that these shafts 103 and 106 rotate at a common (e.g., the same) speed. Furthermore, in some embodiments, the gearing 100 and the transmission output shaft 106 may be omitted where the functionality of the gearing 100 is integrated into the transmission 98. In still other embodiments, the transmission 98 may be omitted where decoupling of the second propulsor rotor 24 is not required and/or where an optional additional speed change between the second output of the geartrain 96 and the second propulsor rotor 24 is not required.

During operation, air enters the aircraft propulsion system 20 through a propulsion system inlet 108. An outer stream of this air is directed through the duct 50 and across a radial outer portion of the first propulsor rotor 22—bypassing/flowing radially outboard of the first compressor rotor 26—to an inlet 110 into the bypass flowpath 78. In embodiments with non-ducted rotors, the duct 50 may represent an area of airflow downstream of the first propulsor rotor 22 that bypasses the engine core 28. An inner stream of the air is directed through the duct 50 and across a radial inner portion of the first propulsor rotor 22 and the first compressor rotor 26 to the core inlet 62. The air entering the engine core 28 through the core inlet 62 is directed into an inner core flowpath 112; e.g., an annular core flowpath. This core flowpath 112 extends sequentially through the LPC section 66A, the HPC section 66B, the combustor section 67, the HPT section 68A and the LPT section 68B to the core exhaust 64. The air within the core flowpath 112 may be referred to as "core air".

The core air is compressed by the LPC rotor 80 and the HPC rotor 81 and directed into a combustion chamber 114 (e.g., an annular combustion chamber) of a combustor 116 (e.g., an annular combustor) in the combustor section 67. Fuel is injected into the combustion chamber 114 through one or more fuel injectors 118 (one visible in FIG. 1) and mixed with the compressed core air to provide a fuel-air mixture. This fuel-air mixture is ignited and combustion products thereof flow through and sequentially cause the HPT rotor 82 and the LPT rotor 83 to rotate. The rotation of the HPT rotor 82 drives rotation of the high speed rotating structure 88 and its HPC rotor 81. The rotation of the LPT rotor 83 drives rotation of the low speed rotating structure 92 and its LPC rotor 80. The rotation of the low speed rotating structure 92 drives rotation of the first propulsor rotor 22 through the geartrain 96 during at least (or only) the first and the second modes of operation. The rotation of the low speed rotating structure 92 also drives rotation of the second propulsor rotor 24 and/or the first compressor rotor 26 through the geartrain 96 during at least (or only) the second mode of operation. During the first mode of operation, however, the second propulsor rotor 24 and the first compressor rotor 26 may be stationary; e.g., fixed. The transmission 98 of FIG. 1, for example, may decouple the low speed rotating structure 92 from the second propulsor rotor 24. The first compressor rotor 26 may be braked and/or locked as described below in further detail.

During the first mode of operation, the rotation of the first propulsor rotor 22 propels bypass air (separate from the core air) through the aircraft propulsion system 20 and its bypass flowpath 78 to provide the first direction propulsion; e.g., the forward, horizontal thrust. During the second mode of operation, the rotation of the second propulsor rotor 24 propels additional air (separate from the core air and the bypass air) to provide the second direction propulsion; e.g., the vertical lift. The aircraft may thereby takeoff, land and/or otherwise hover during the second mode of operation, and the aircraft may fly forward or otherwise move during the first mode of operation.

Figure 3:
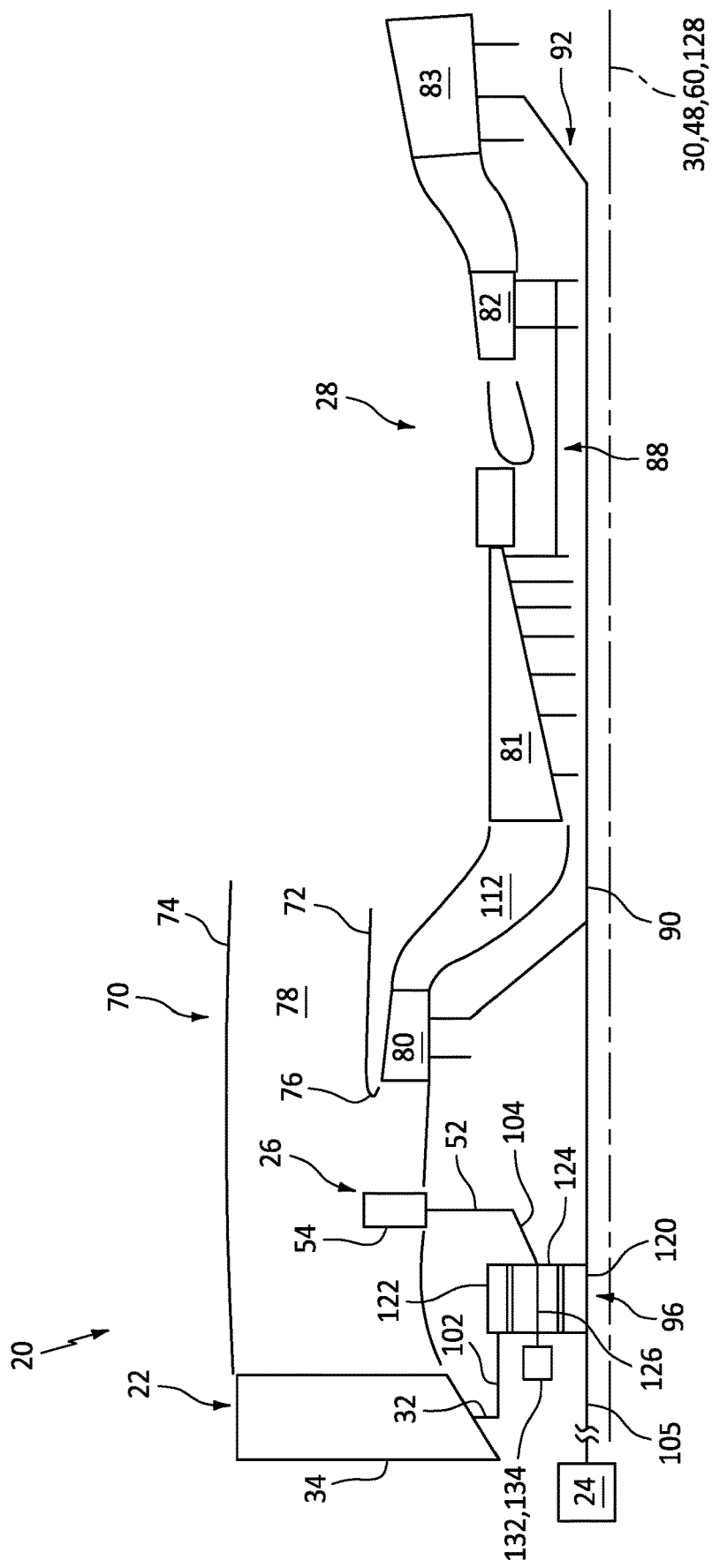
FIG. 3 is a schematic illustration of a portion of the aircraft propulsion system with a downstream stub compressor rotor.
Figure 4:
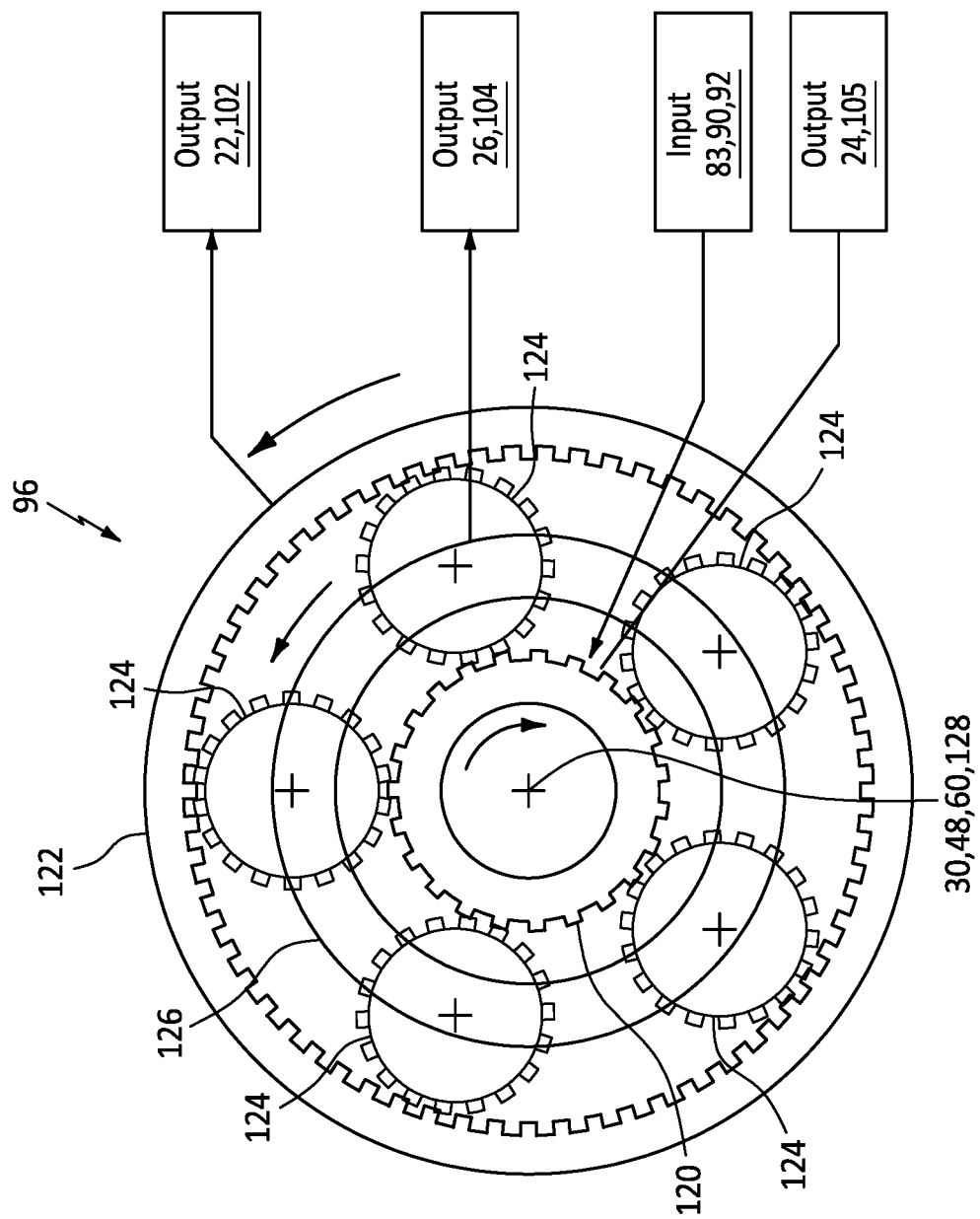
FIG. 4 is a schematic illustration of a geartrain coupled with a power input and one or more power outputs.

FIGS. 3 and 4 illustrate aspects of the geartrain 96 in further detail. The geartrain 96 of FIGS. 3 and 4 includes a sun gear 120, a ring gear 122, a plurality of intermediate gears 124 and a carrier 126. The sun gear 120 is rotatable about a rotational axis 128 of the geartrain 96, which rotational axis 128 may be parallel (e.g., coaxial) with the axis 30, 48, 60. The ring gear 122 circumscribes the sun gear 120, and the ring gear 122 is rotatable about the axis 30, 48, 60, 128. Each of the intermediate gears 124 is disposed (e.g., radially) between and meshed with the sun gear 120 and the ring gear 122. Each of the intermediate gears 124 is rotatably mounted to the carrier 126. The carrier 126 is rotatable about the axis 30, 48, 60, 128. The first propulsor rotor 22 is coupled to and is configured to be rotatably driven by the ring gear 122. The second propulsor rotor 24 is coupled to and is configured to be rotatably driven by the sun gear 120. However, it is contemplated the transmission 98 may alternatively be coupled to the low speed rotating structure 92 independent of the geartrain 96 and its sun gear 120. The first compressor rotor 26 is coupled to and is configured to be rotatably driven by the carrier 126. The low speed rotating structure 92 and its LPT rotor 83 are coupled to and configured to rotatably drive the sun gear 120.

Referring to FIG. 1, the aircraft propulsion system 20 may include a propulsor rotation control system 130. This propulsor rotation control system 130 may include at least one brake 132 and/or at least one lock device 134.

Figure 5:
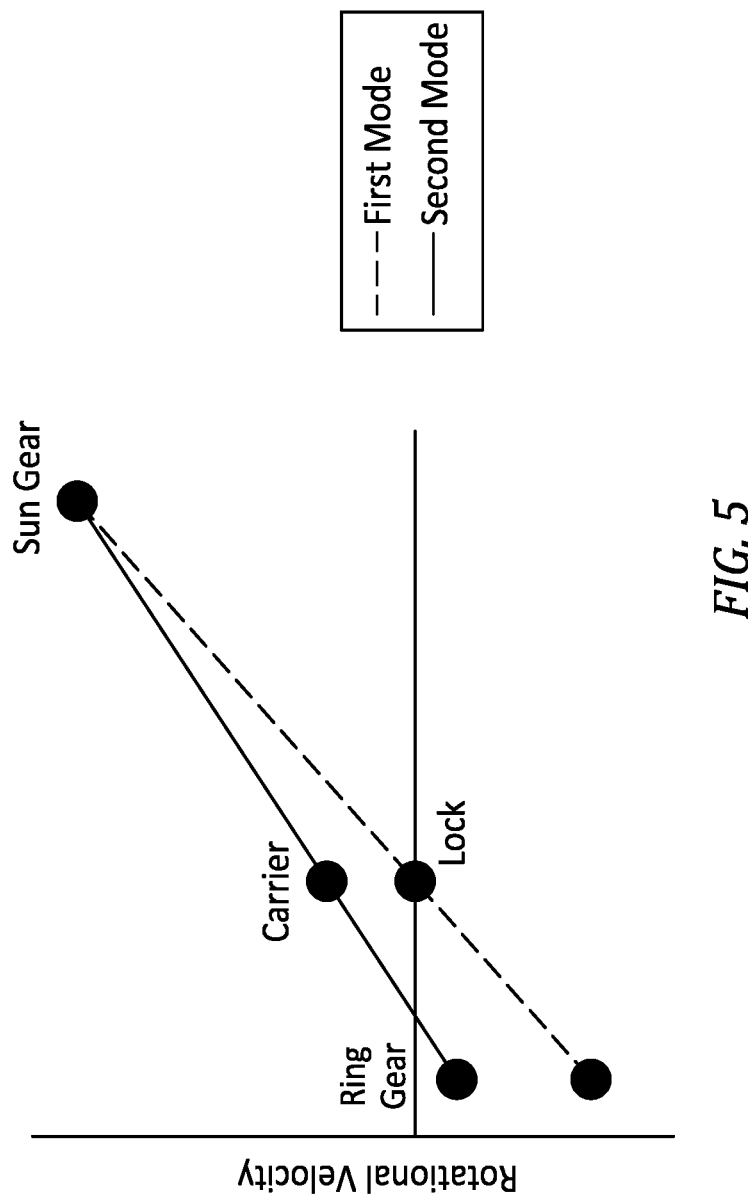
FIG. 5 is a graph depicting changes to rotational speeds during various modes of propulsion system operation.

The brake 132 and/or the lock device 134 may be located at location 136 in FIG. 1, or another suitable location. The brake 132 is configured to brake (e.g., slow and/or stop) rotation of the first compressor rotor 26 about the axis 30, 48, 60, 128. The lock device 134 is configured to lock (e.g., fix, prevent) rotation of the first compressor rotor 26 about the axis 30, 48, 60, 128, for example, following the braking of the first compressor rotor 26 to a zero rotational speed about the axis 30, 48, 60, 128 using the brake 132. When the first compressor rotor 26 is rotationally fixed and the second propulsor rotor 24 is decoupled from the geartrain 96 (e.g., during the first mode of operation of FIG. 5), the geartrain 96 may transfer (e.g., all, minus losses in the powertrain 94) the power output from the low speed rotating structure 92 and its LPT rotor 83 to the first propulsor rotor 22 and the powertrain element(s) therebetween. By contrast, when the first compressor rotor 26 is rotationally free to rotate and the second propulsor rotor 24 is coupled to the geartrain 96 (e.g., during the second mode of operation of FIG. 5), the geartrain 96 may transfer and distribute the power output from the low speed rotating structure 92 and its LPT rotor 83 to each of the bladed rotors 22, 24 and 26. The rotational velocity of the first propulsor rotor 22 is decreased by also rotating the first compressor rotor 26.

The reduction in first propulsor rotational velocity may significantly reduce or make de minimis thrust produced by the first propulsor rotor 22. However, the first propulsor rotor 22 may continue to rotate and thereby facilitate lubrication of its associated bearings. Moreover, the rotation of the first propulsor rotor 22 may facilitate directing debris ingested by the aircraft propulsion system 20 into the bypass flowpath 78 rather than the core flowpath 112. Rotation of the first compressor rotor 26 may also facilitate directing debris ingested by the aircraft propulsion system 20 into the bypass flowpath 78 rather than the core flowpath 112. In addition, rotation of the first compressor rotor 26 may boost air pressure of the air received at the core inlet 62 so as to, for example, at least partially make up for boost lost by rotating the first propulsor rotor 22 at a slower rotational velocity during the second mode of operation. It is also worth noting, by rotating the first propulsor rotor 22 at a slower rotational velocity, more power may be provided for rotating the second propulsor rotor 24 (even when considering power used for rotating the first compressor rotor 26).

Figure 6:
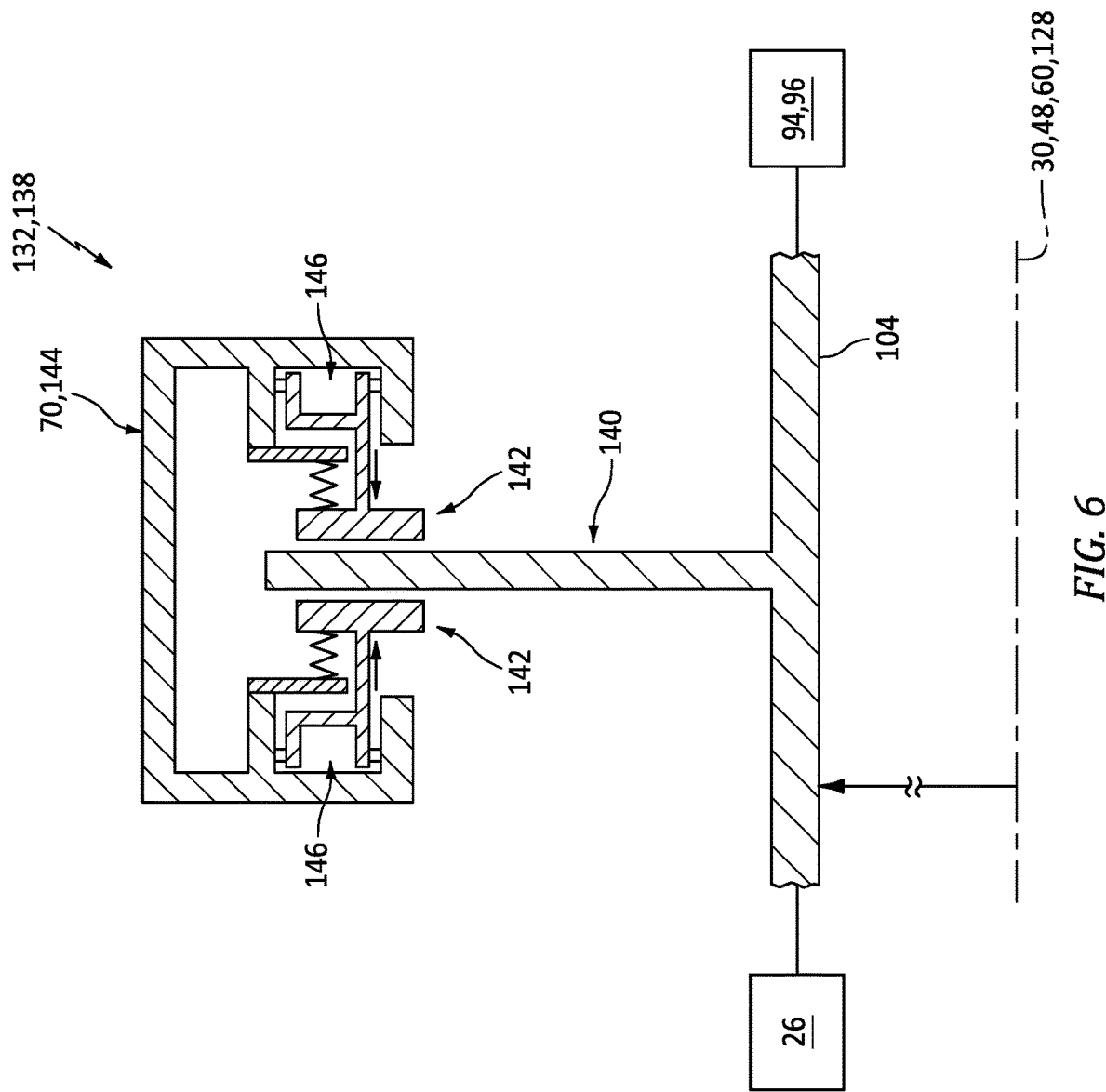
FIG. 6 is a partial sectional illustration of a rotating assembly configured with a brake.

Referring to FIG. 6, the brake 132 may be configured as or otherwise include a disk brake 138. The disk brake 138 of FIG. 6 includes a brake rotor 140 and one or more brake pads 142. The brake rotor 140 is configured rotatable with the first compressor rotor 26. The brake rotor 140, for example, may be connected to and rotatable with the first compressor shaft 104, or another rotating element (directly or indirectly) rotatable with the first compressor shaft 104. The brake pads 142 are anchored to a stationary structure 144, which may be part of the engine housing 70 and/or an airframe of the aircraft. The brake pads 142 may be actuated by one or more brake actuators 146 (e.g., hydraulic brake actuators) to move the brake pads 142 from an open position to a closed position. In the open position, the brake pads 142 are spaced from and do not engage (e.g., contact) the brake rotor 140 (see position of FIG. 6). In the closed position, the brake pads 142 engage (e.g., contact) and clamp onto (e.g., squeeze) the brake rotor 140. Frictional rubbing between the brake pads 142 and the brake rotor 140 is operable to brake rotation of the brake rotor 140 and, thus, the first compressor shaft 104 (or other rotating element) connected thereto. The brake 132 of the present disclosure, however, is not limited to such an exemplary disk brake configuration. Furthermore, it is contemplated the brake 132 may alternatively be configured as another type of brake such as, for example, a drum brake, or a set of clutch plates.

Figure 7:
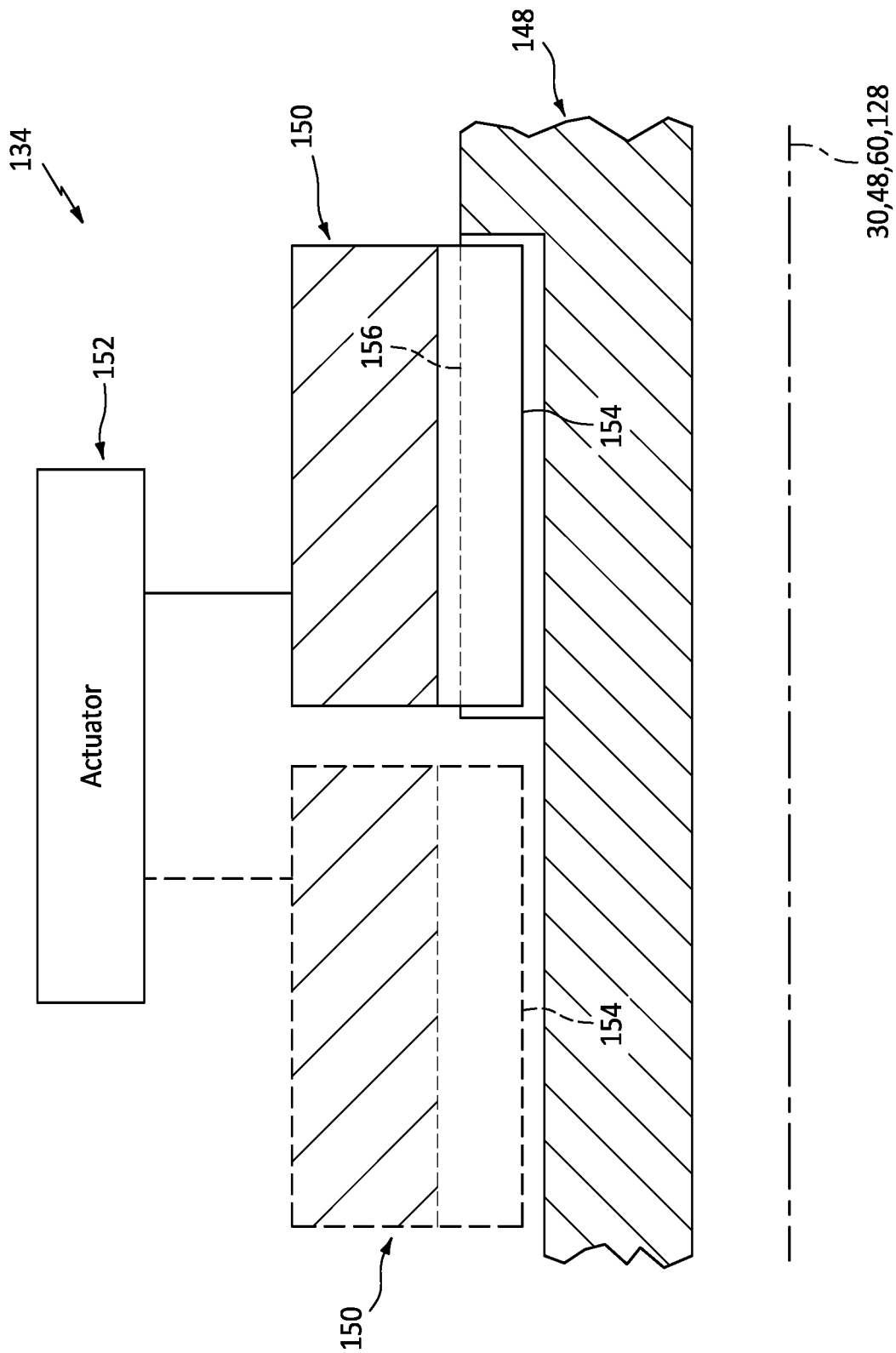
FIG. 7 is a partial, side sectional schematic illustration of a lock device.

Referring to FIG. 7, the lock device 134 may be configured as a splined lock device; e.g., a splined coupling. The lock device 134 of FIG. 7, for example, includes an inner lock element 148 (e.g., a splined shaft), an outer lock element 150 (e.g., a splined sleeve) and an actuator 152. The inner lock element 148 is rotatable about the axis 30, 48, 60, 128. The outer lock element 150 is rotationally fixed about the axis 30, 48, 60, 128. However, the actuator 152 is configured to move (e.g., axially translate) the outer lock element 150 along the axis 30, 48, 60, 128 and the inner lock element 148 between an unlocked position (see dashed line in FIG. 7) and a locked position (see solid line in FIG. 7; see also FIG. 8). At the unlocked position, inner splines 154 of the outer lock element 150 are disengaged (e.g., spaced) from outer splines 156 of the inner lock element 148. At the locked position, the inner splines 154 of the outer lock element 150 are engaged (e.g., meshed) with the outer splines 156 of the inner lock element 148 (see also FIG. 8). With this arrangement, when the lock device 134 is unlocked and its outer lock element 150 is in the unlocked position, the inner lock element 148 may rotate (e.g., freely, unencumbered by the outer lock element 150) about the axis 30, 48, 60, 128. However, when the lock device 134 is locked and its outer lock element 150 is in the locked position of FIG. 8, the outer lock element 150 is meshed with the inner lock element 148 and prevents rotation of the inner lock element 148 about the axis.

Figure 8:
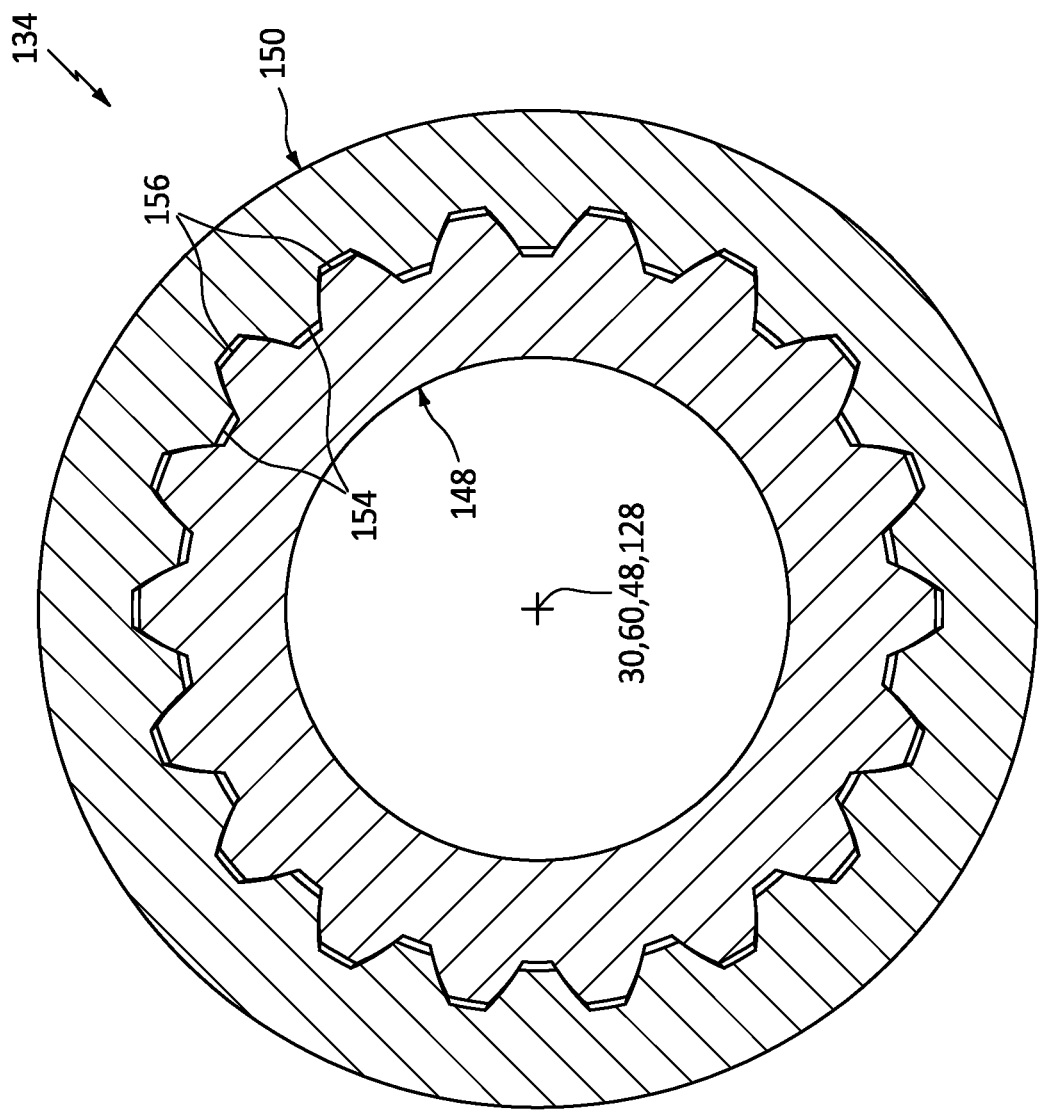
FIG. 8 is a cross-sectional illustration of the lock device of FIG. 7.

Referring to FIGS. 1 and 7, the inner lock element 148 of the lock device 134 may be configured as part of or may be attached (directly or indirectly) to the first compressor shaft 104, or any other element rotatable therewith. While the inner lock element 148 of FIGS. 7 and 8 is described as the rotating element and the outer lock element 150 is described as the rotationally fixed element, the operation of these elements 148 and 150 may be switched in other embodiments. In particular, the inner lock element 148 may alternatively be configured as the rotationally fixed element and axially translatable by the actuator 152, and the outer lock element 150 may be configured as the rotating element. Furthermore, various other types of rotational lock devices are known in the art, and the present disclosure is not limited to any particular ones thereof.

Figure 9:
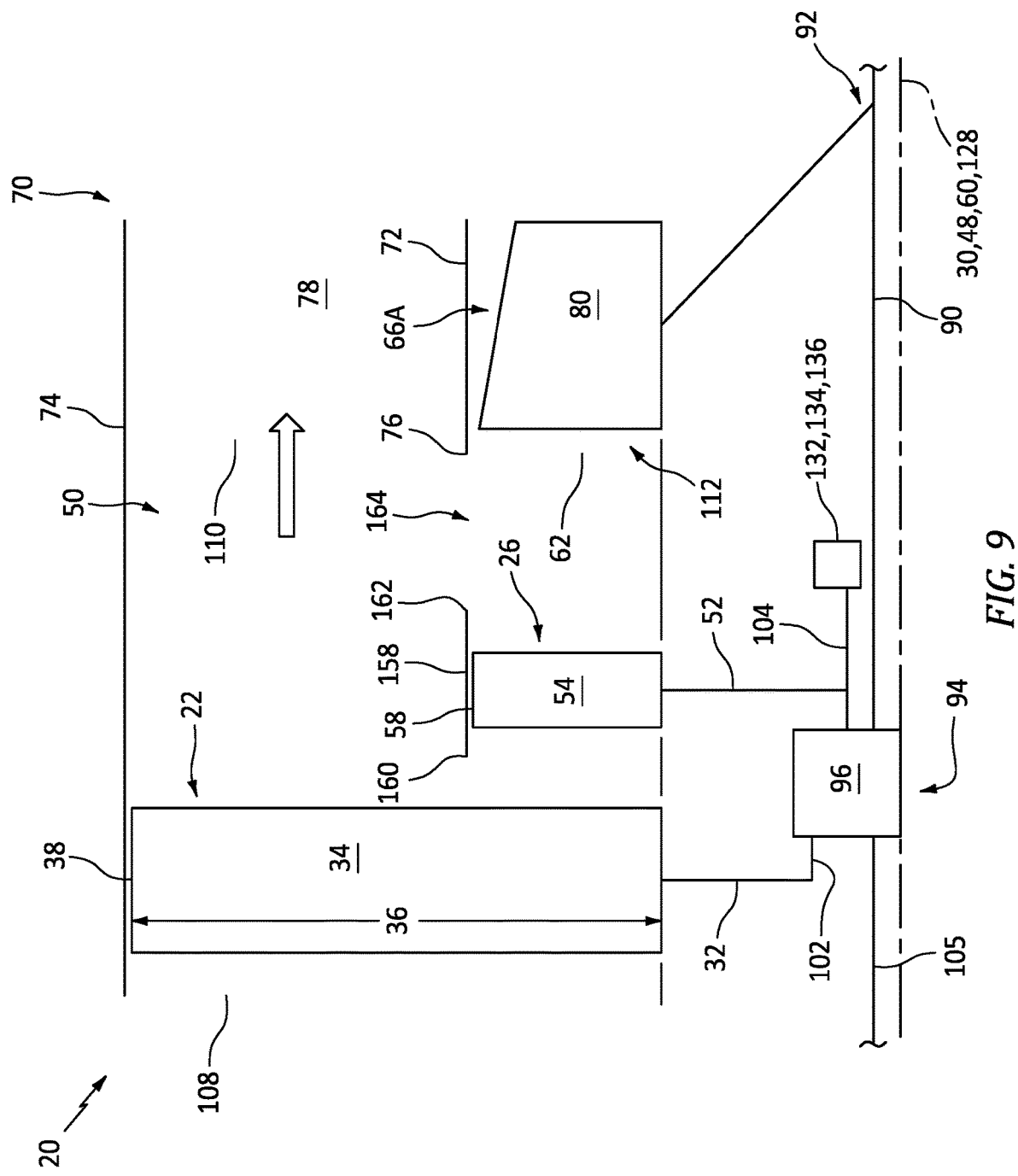
FIG. 9 is a schematic illustration of a portion of the aircraft propulsion system with a shroud for its stub compressor rotor.

In some embodiments, referring to FIG. 9, the aircraft propulsion system 20 may include a shroud 158 for the first compressor rotor 26. A wall of this shroud 158 is disposed radially outboard and adjacent (e.g., in close proximity to) each first compressor blade tip 58. The shroud 158 extends circumferentially about (e.g., completely around) the axis 30, 48, 60, 128. The shroud 158 may thereby circumscribe the first compressor rotor 26. The shroud 158 extends axially along the axis 30, 48, 60, 128 between a forward, upstream end 160 (e.g., leading edge) of the shroud 158 and an aft, downstream end 162 (e.g., trailing edge) of the shroud 158. The shroud downstream end 162 of FIG. 9 is axially separated from the upstream end 76 of the inner case 72 by a gap 164; e.g., an annular port.

The shroud upstream end 160 may be radially aligned with an intermediate position along each first propulsor blade span 36. This intermediate position may be disposed between one-tenth (1/10) and one-half (1/2) of each first propulsor blade span 36, from the platform to the tip 38. The intermediate position of FIG. 9, for example, is disposed between one-quarter (1/4) and one-third (1/3) of each first propulsor blade span 36.

Figure 10A:
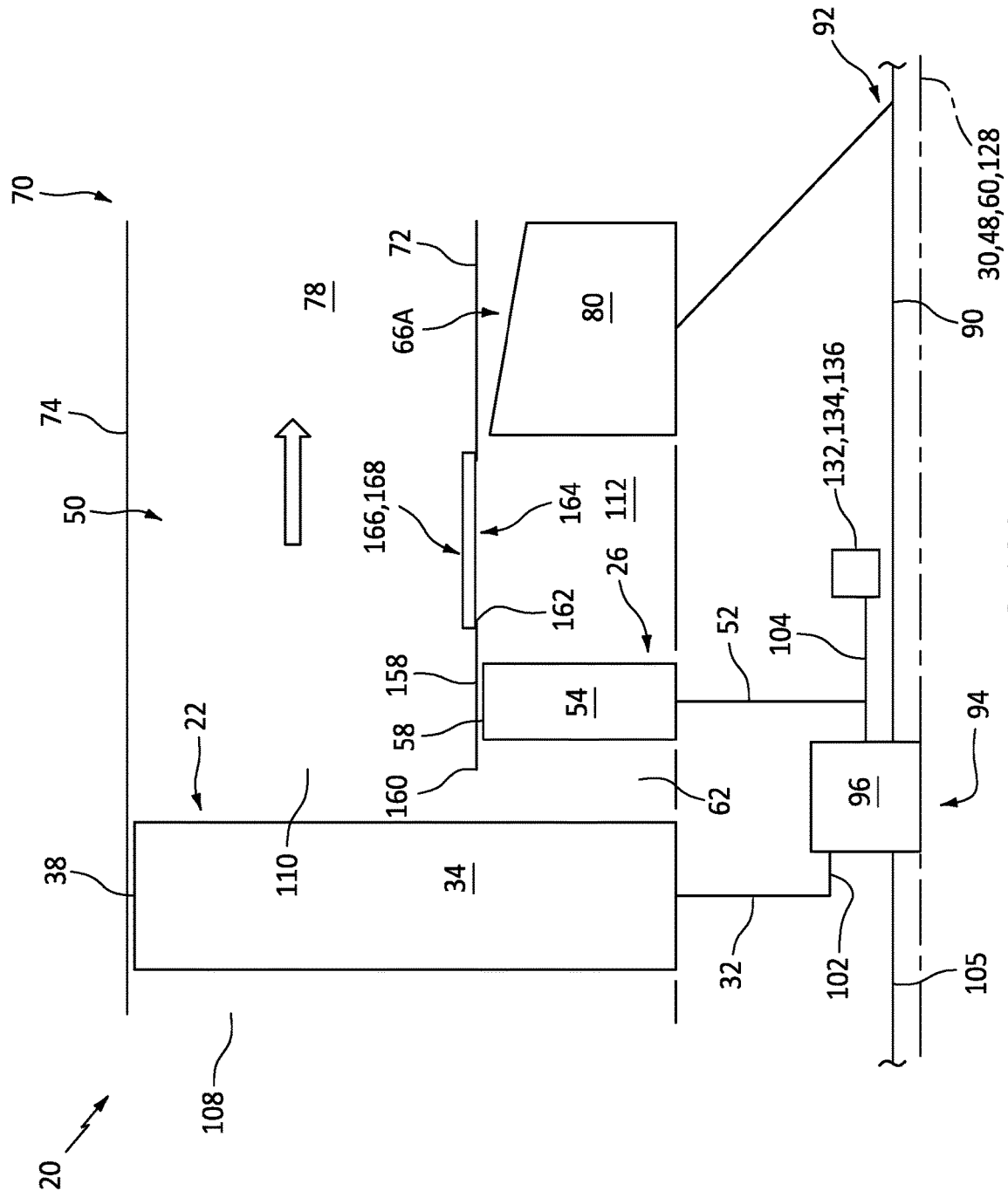
FIGS. 10A and 10B are schematic illustrations of a portion of the aircraft propulsion system with a bleed valve in various positions.
Figure 10B:
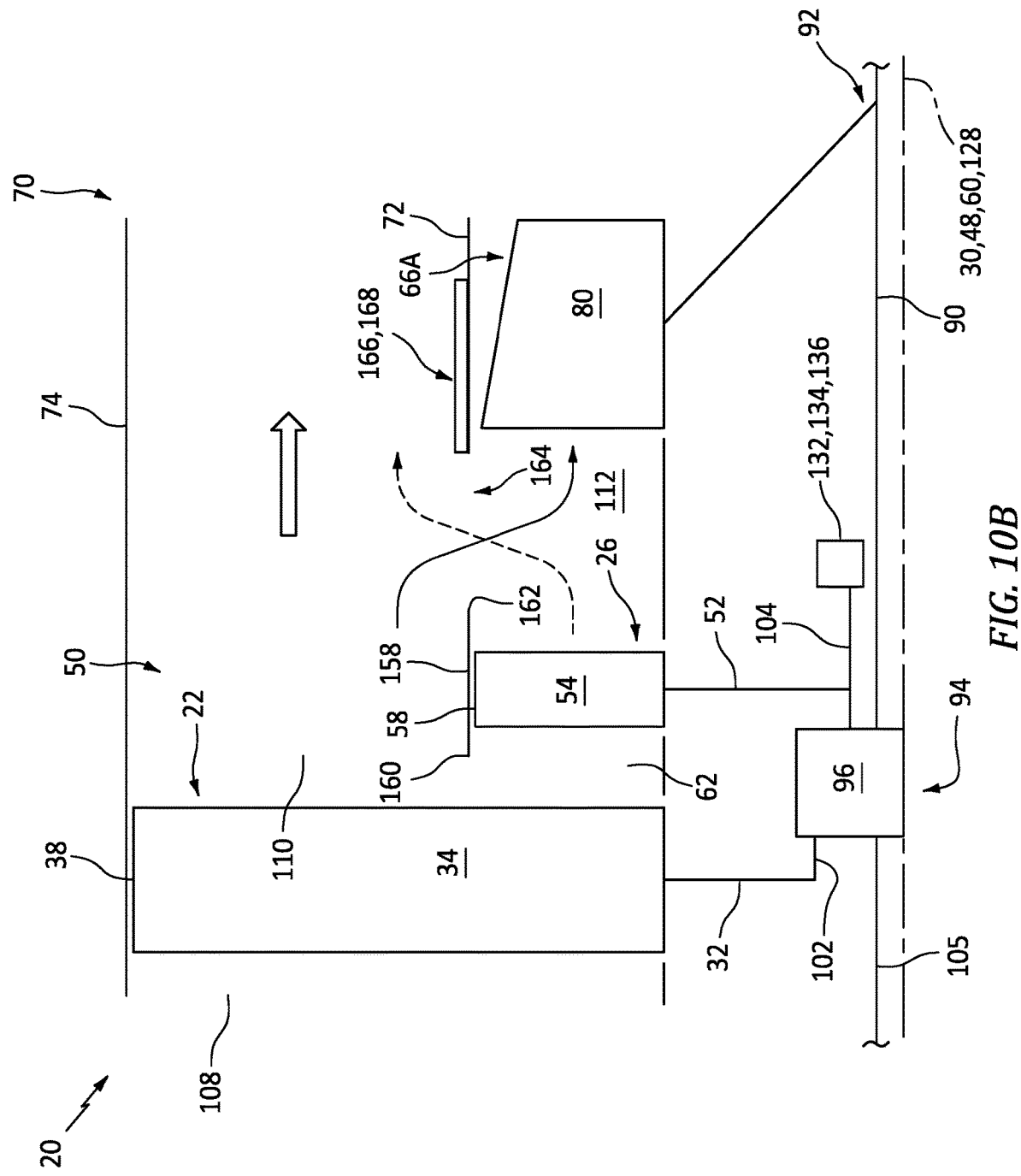

In some embodiments, referring to FIGS. 10A and 10B, the gap 164 between the shroud 158 and the inner case 72 may be selectively opened and closed by a bleed valve 166. The bleed valve 166 of FIGS. 10A and 10B includes one or more translating doors 168 arranged circumferentially about the axis 30, 48, 60, 128. Each translating door 168 is configured to move (e.g., axially translate) between a closed position (e.g., see FIG. 10A) and an open position (e.g., see FIG. 10B). In the closed position of FIG. 10B, the first compressor rotor 26 is affectively disposed within the core flowpath 112 as the bleed valve 166 may (e.g., completely) close off the gap 164 between the shroud 158 and the inner case 72. The closed bleed valve 166 and the shroud 158, in other words, extend the length of the inner case 72. Of course, it is also contemplated the shroud 158 may alternatively be configured as an integral part of the inner case 72. In the open position of FIG. 10B, the open bleed valve 166 fluidly couples the core flowpath 112 with the bypass flowpath 78. Depending upon the pressure drop across the open bleed valve 166, some core air may bleed into the bypass flowpath 78 (see dashed flow line) or some bypass air may bleed into the core flowpath 112 (see solid flow line).

Figure 11:
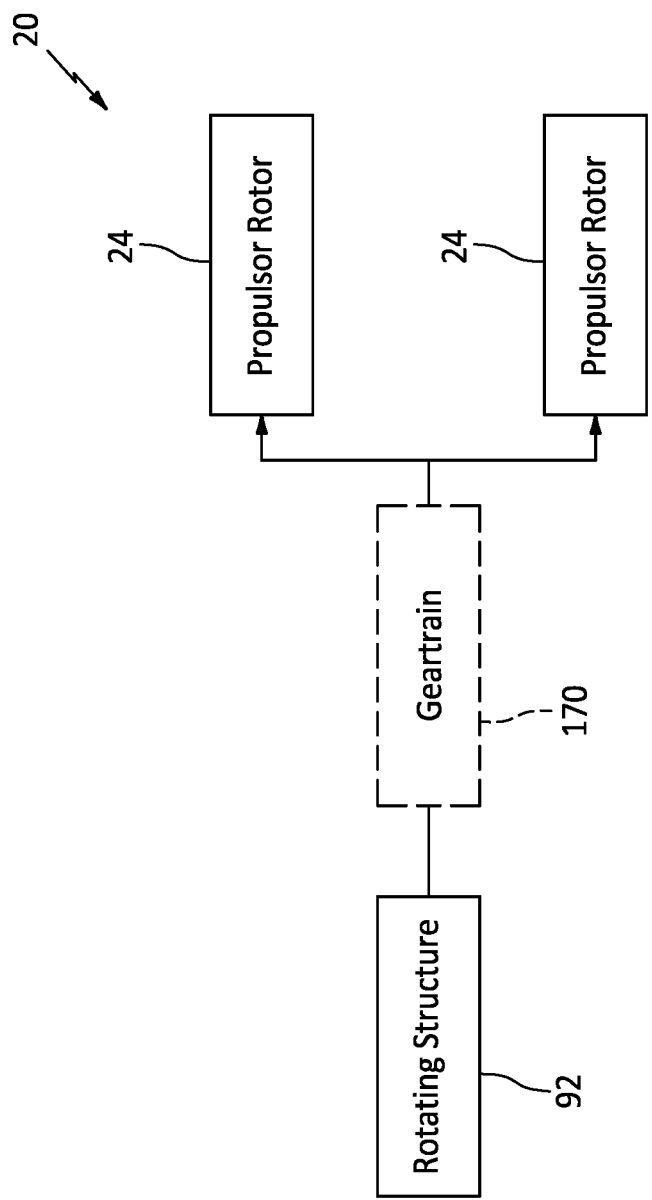
FIG. 11 is a schematic illustration of a portion of a rotating structure coupled to and driving multiple propulsor rotors for generating propulsive lift.

The engine core 28 (e.g., see FIG. 1) may have various configurations other than those described above. The engine core 28, for example, may be configured with a single spool, with two spools (e.g., see FIG. 1), or with more than two spools. The engine core 28 may be configured with one or more axial flow compressor sections, one or more radial flow compressor sections, one or more axial flow turbine sections and/or one or more radial flow turbine sections. The engine core 28 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 28 of the present disclosure may drive more than the two propulsor rotors, or a single one of the propulsor rotors and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 11 includes multiple second propulsor rotors 24 rotatably driven by the low speed rotating structure 92. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 92 through a power splitting geartrain 170. Furthermore, the present disclosure is not limited to aircraft propulsion system applications. The engine core 28, for example, may be configured to drive an electrical generator in addition to or alternatively to the one or more propulsor rotors.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;
a first bladed rotor coupled to the ring gear, the first bladed rotor comprising a propulsor rotor;
a second bladed rotor coupled to the carrier, the second bladed rotor comprising a compressor rotor; and
a rotating structure coupled to the sun gear, the rotating structure comprising a turbine rotor, and the rotating structure configured to drive rotation of the first bladed rotor and the second bladed rotor through the geartrain.

2. The assembly of claim 1, further comprising:
a duct;
the first bladed rotor and the second bladed rotor each arranged in the duct.

3. The assembly of claim 1, wherein
the first bladed rotor includes a plurality of first rotor blades arranged circumferentially about the axis, and a first of the plurality of first rotor blades has a first span length; and
the second bladed rotor includes a plurality of second rotor blades arranged circumferentially about the axis, a first of the plurality of second rotor blades has a second span length, and the first span length is greater than the second span length.

4. The assembly of claim 3, wherein the first span length is greater than one and one-quarter times the second span length.

5. The assembly of claim 3, wherein the first span length is greater than two times the second span length.

6. An assembly for an aircraft, comprising:
a geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;
a duct;
a first bladed rotor coupled to the ring gear and arranged in the duct;
a second bladed rotor coupled to the carrier and arranged in the duct, wherein the first bladed rotor is disposed upstream of the second bladed rotor within the duct; and
a rotating structure coupled to the sun gear, the rotating structure comprising a turbine rotor, and the rotating structure configured to drive rotation of the first bladed rotor and the second bladed rotor through the geartrain.

7. The assembly of claim 1, further comprising:
a shroud radially adjacent and circumscribing the second bladed rotor;
the first bladed rotor including a plurality of first rotor blades arranged circumferentially about the axis; and
a leading edge of the shroud radially aligned with an intermediate position along a span of a first of the plurality of first rotor blades.

8. An assembly for an aircraft, comprising:
a geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;
a first bladed rotor coupled to the ring gear;
a second bladed rotor coupled to the carrier;
a rotating structure coupled to the sun gear, the rotating structure comprising a turbine rotor, and the rotating structure configured to drive rotation of the first bladed rotor and the second bladed rotor through the geartrain;
an inner flowpath; and
an outer flowpath radially outboard of the inner flowpath;
the first bladed rotor configured to direct air into the inner flowpath and the outer flowpath; and
the second bladed rotor and the turbine rotor disposed in the inner flowpath.

9. The assembly of claim 8, further comprising:

a bleed valve configured to fluidly couple the inner flowpath and the outer flowpath;
the bleed valve disposed downstream of the second bladed rotor along the inner flowpath.

10. The assembly of claim 9, wherein
the rotating structure further comprises a compressor rotor disposed in the inner flowpath; and
the bleed valve is disposed along the inner flowpath between the second bladed rotor and the compressor rotor.

11. The assembly of claim 1, further comprising a lock device configured to lock rotation of the carrier about the axis.

12. The assembly of claim 1, further comprising a brake configured to brake rotation of the carrier about the axis.

13. An assembly for an aircraft, comprising:
a geartrain including a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;
a first bladed rotor coupled to the ring gear;
a second bladed rotor coupled to the carrier;
a rotating structure coupled to the sun gear, the rotating structure comprising a turbine rotor, and the rotating structure configured to drive rotation of the first bladed rotor and the second bladed rotor through the geartrain;
a third bladed rotor coupled to the sun gear;
the rotating structure further configured to drive rotation of the third bladed rotor; and
the geartrain between the rotating structure and the third bladed rotor.

14. The assembly of claim 13, wherein
the axis is a first rotor axis;
the first bladed rotor and the second bladed rotor are rotatable about the first rotor axis; and
the third bladed rotor is rotatable about a second rotor axis that is angularly offset from the first rotor axis.

15. The assembly of claim 13, wherein
the first bladed rotor is configured to generate propulsive force in a first direction; and
the second bladed rotor is configured to generate propulsive force in a second direction that is different than the first direction.

16. The assembly of claim 13, wherein at least one of
the first bladed rotor comprises a ducted rotor; or
the second bladed rotor comprises an open rotor.

17. An assembly for an aircraft, comprising:
a powertrain comprising an epicyclic geartrain, the epicyclic geartrain including a first output, a second output and an input;
a first bladed rotor coupled to the first output and configured to rotate about an axis;
a second bladed rotor coupled to the second output and configured to rotate about the axis; and
a rotating structure coupled to the input, the rotating structure comprising a turbine rotor;
the powertrain configured to transfer rotational power from the rotating structure to the first bladed rotor during a first mode where the second bladed rotor is stationary; and
the powertrain configured to transfer rotational power from the rotating structure to the first bladed rotor and the second bladed rotor during a second mode.

18. The assembly of claim 17, wherein the powertrain further comprises at least one of
a lock device configured to lock rotation of the second bladed rotor about the axis; or
a brake configured to brake rotation of the second bladed rotor about the axis.

* * * * *